W. F. FOLMER.
MULTIPLYING BACK FOR CAMERAS.
APPLICATION FILED JUNE 6, 1910.
1,045,539.
Patented Nov. 26, 1912.
2 SHEETS—SHEET 1.
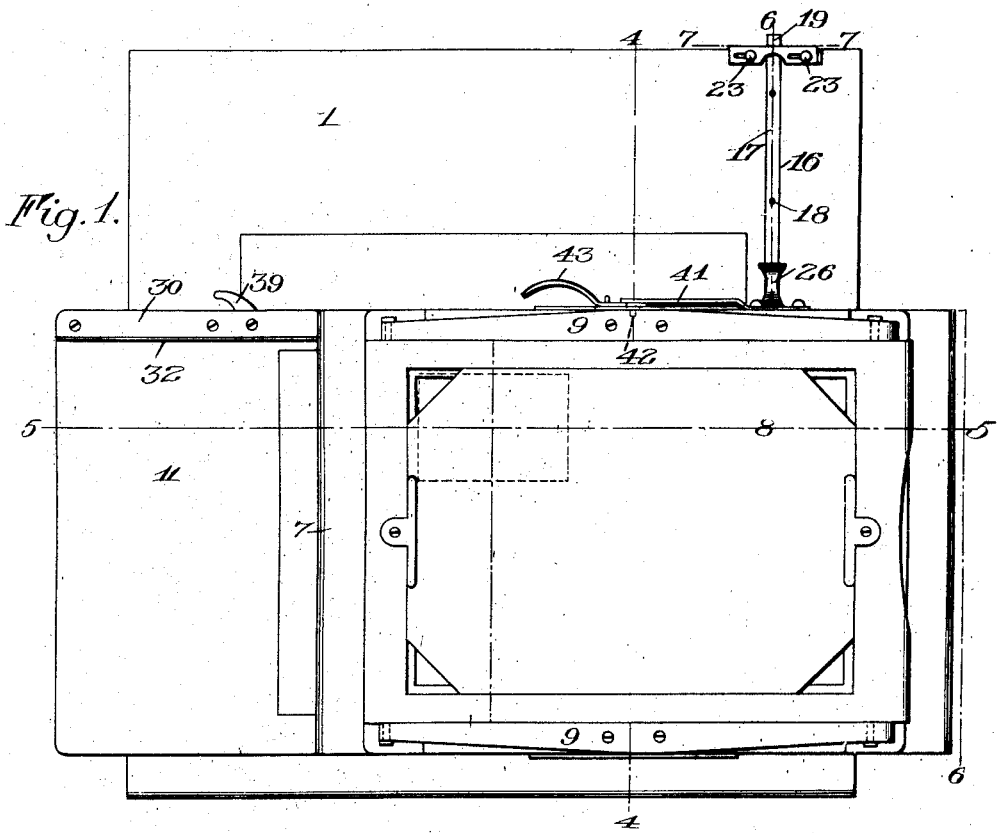
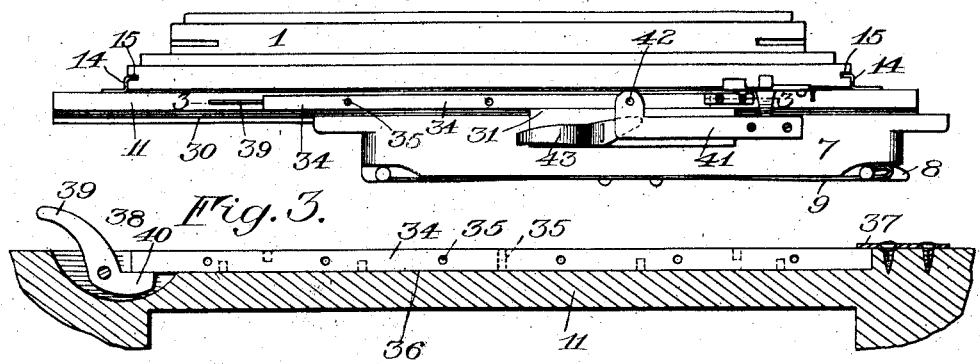
Inventor
William F. Folmer
Witnesses
Walter B. Payne
Russell B. Griffith
By
his Attorneys

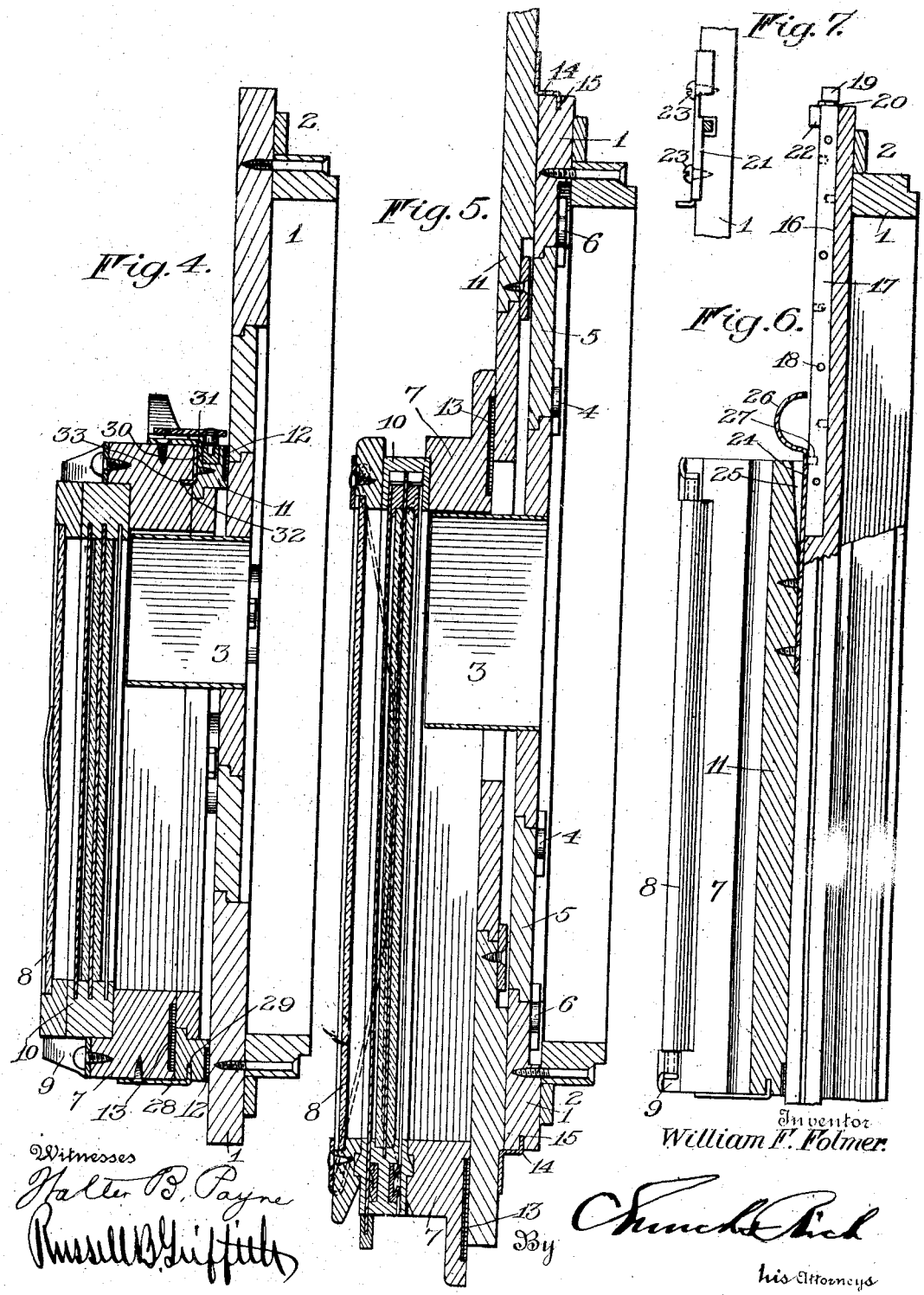

UNITED STATES PATENT OFFICE.

WILLIAM F. FOLMER, OF ROCHESTER, NEW YORK, ASSIGNOR TO EASTMAN KODAK CO., OF ROCHESTER, NEW YORK, A CORPORATION OF NEW YORK.

MULTIPLYING-BACK FOR CAMERAS.

1,045,539. Specification of Letters Patent. Patented Nov. 26, 1912.

Application filed June 6, 1910. Serial No. 565,304.

*To all whom it may concern:*

Be it known that I, WILLIAM F. FOLMER, of the city of Rochester, in the county of Monroe and State of New York, have invented certain new and useful Improvements in Multiplying-Backs for Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras, and it has for its object to provide an improved camera back for facilitating the recording of a plurality of views on the same photographic plate or sensitized surface.

The improvements are directed in part to the means for guiding the relatively movable elements that operate to bring different portions of the sensitized medium successively into position for exposure and to the means for regulating such movements according to the number and size of the exposures.

To these and other ends the invention consists in certain improvements and combinations of parts all as will be hereinafter more fully described, the novel features being pointed out in the claims at the end of the specification.

In the drawings: Figure 1 is a rear elevation of a multiplying back constructed in accordance with and illustrating one embodiment of my invention; Fig. 2 is a top plan view thereof; Fig. 3 is a detail section taken substantially on the line 3—3 of Fig. 2; Fig. 4 is a vertical section taken substantially on the line 4—4 of Fig. 1; Fig. 5 is a horizontal section taken substantially on the line 5—5 of Fig. 1; Fig. 6 is a vertical section taken substantially on the line 6—6 of Fig. 1, and Fig. 7 is a detail section taken substantially on the line 7—7 of Fig. 1.

Similar reference numerals throughout the several figures indicate the same parts.

My improvements are applicable and may be used with equal advantage when incorporated in backs both of the type that forms a permanently attached part of the camera or a removable part, but in the present instance I have shown a back of the latter kind comprising a supporting frame 1 suitably formed, as by the provision of rabbets 2, to coöperate with the correspondingly formed rear face of the camera box (not shown). This frame preferably carries the masking hood 3 for determining the size of the exposed area, which hood is held by buttons 4 on a diaphragm 5 that is in turn held removably mounted in the frame by buttons 6. The frame of the present embodiment of the invention is substantially square, as shown, and adapted for a square camera box whereby it may be reversed or its position easily changed with relation thereto.

Carried on the supporting frame to move relatively thereto in two directions is a frame 7 to which is adapted to be applied the sensitized medium and which may be in this respect of any desired construction. In the present instance it comprises a focusing screen 8 adapted to yield rearwardly on the connecting springs 9 to receive between it and its support the ordinary plate holder 10, such as shown in Figs. 4 and 5. The frame 7 is carried on the supporting frame 1 through the medium of the intermediate frame 11 and the adjustment of the plate holding frame in two directions, before referred to, is effected by having the frame 11 adjustable on the frame 1 in one direction and the frame 7 in turn adjustable on the frame 11 in another direction. The front face of the frame 11 is preferably provided with a strip of pile fabric, or other suitable material, 12 to prevent the admission of light between the two frames as frame 11 passes across the adjacent contacting face of the frame 1, and the corresponding face of the frame 7 is similarly fitted at 13 for a similar purpose.

The movements of the intermediate frame 11 on the supporting frame 1 are guided and the two frames are held together by flange plates 14 on the frame 11 sliding in guides or grooves 15 on two opposite lateral edges of the frame 1, this movement bringing about a vertical adjustment of the sensitized medium with respect to the supporting frame of the camera box according to the position of the device in Fig. 1 of the drawings. To lock the two frames mentioned in position for the exposure of a given portion of the plate, one of the frames, being the supporting frame 1 in the present instance, has formed in its contacting face a recess 16 that forms a seat for a rod 17 that is supported thereby with its outer face flush with the face of the frame. This rod is preferably square in cross section, as shown in Fig. 2, but, at any rate, has a plurality of faces any of which may be exposed on the face of its carrying frame by removing the rod and replacing it in its seat in another position. Each face has a series of abutments 18 formed, in the present instance, by recesses, and the abutments of each series are differently spaced longitudinally of the rod which latter extends in the direction of relative movement of the frames.

A head 19 is formed on the outer end of the rod that projects beyond the frame to be readily accessible to the fingers of the operator and just beneath this head is a cutaway portion 20 extending circumferentially on all sides and into which is adapted to move (Fig. 7) the locking flange 21 of a sliding bolt 22 mounted by means of guide pins 23 on the frame 1, which bolt secures the rod in its seat.

Coöperating with the rod 17 is a spring catch 24 arranged in a recess 25 in the adjacent face of the intermediate frame 11 and having a finger portion 26. A stop pin 27 on the catch engages the recesses or abutments 18 of the different series according to the position of the rod in its seat.

The plate holding frame 7 is guided on the intermediate frame 11 in a horizontal direction with respect to the position of Fig. 1 or at an angle to the direction of adjustment just described and is held in engagement therewith at one edge by a flange plate 28 coöperating with a guiding groove 29 in the lower edge of the frame 11. The opposite or upper edge of the latter frame is provided with a guide strip 30 in rear of which the said frame is recessed to receive a flange 31 on the corresponding edge of the frame 7 that engages on the under side of the strip. The latter is also formed to provide a projecting rib or flange 32 which is received within a groove or guide 33 in the adjacent face of the frame 7 to support the weight of the latter, as well as performing its guiding capacity, while the flange 31 holds the frames together in intimate contact. Somewhat such devices are preferably employed for locking the frames 7 and 11 in their various positions of adjustment as are utilized with respect to the frames 1 and 11 and they comprise in the present instance a bar 34 (Figs. 2 and 3) like the body portion of the bar 17 and similarly provided on its various faces with abutments 35, the bar being partly held in a recess 36 in the top of the frame 11 by a lip 37 overhanging the same at one end. At the opposite end is arranged a kicker 38 comprising a lever having one arm 39 projecting from the frame and the other arm 40 arranged to rise beneath the bar and dislodge it laterally from its seat when it is desired to change its position therein for the purposes heretofore described in connection with the bar 17.

A spring arm 41 carried on the plate holding frame 7 constitutes a spring catch having a stop pin 42 coöperating with the abutments 35 of the rod 34, which arm overhangs the seat 36 in such manner as to retain the bar therein with the assistance of the lip 37. In order to facilitate the disengagement of the stop pin 42 an operating member is provided in the form of a lever 43 engaging under the end of the arm in a manner to afford advantageous leverage.

No detail instructions as to the operation of the parts is thought to be necessary herein. The sensitized medium being held within the rear or outer frame 7 and accessible through the intermediate frame 11 to the masking hood 3, the various adjustments of the frame 7 on the frame 11 and of the latter on the supporting frame 1 by which the masking hood is carried, enables the image to be cast upon successive adjacent areas of the photographic plate in both vertical and horizontal rows. When the exposures are numerous they are correspondingly small, interchangeable hoods 3 of different sizes being utilized and the controlling members or rods 17 and 34 being set to present those series of abutments which will bring about, automatically, the proper number of halts in the relative movements of the frames to properly space the exposures and yet utilize, economically, the surface of the sensitized medium.

I claim as my invention:

1. In a multiplying back for cameras, the combination with two relatively adjustable frames having a position in rear of the camera, one of which is adapted to have applied thereto the sensitized medium, of a seat on one of said frames, a removable member arranged in the seat to extend in the direction of relative movement of the frames and provided with a head projecting from the side of the frame, said member having a plurality of faces each provided with a series of abutments spaced differently longitudinally of the member from the abutments on another face, a stop on the other frame coöperating with the different series of abutments, selectively, according to the position of the member in its seat and a sliding bolt engaging beneath the head of the member to lock it in its seat.

2. In a multiplying back for cameras, the combination with two relatively adjustable frames having a position in rear of the camera, one of which is adapted to have applied thereto the sensitized medium, of a seat on one of said frames, a removable member arranged in the seat to extend in the direction of movement of the frames and having a plurality of faces each provided with a series of abutments spaced differently longitudinally of the member from the abutments on another face, a stop on the other frame coöperating with the different series of abutments, selectively, according to the position of the member in its seat and a kicker for displacing the member laterally from the seat comprising a lever having one arm projecting from the frame and the other arranged in the bottom of the seat to rise against the member when the first is operated.

3. In a multiplying back for cameras, the combination with two relatively movable frames arranged face to face and having a position in rear of the camera, one of which is adapted to have applied thereto the sensitized medium, of a guide strip on the face of one frame having an outwardly turned flange, a guide on the adjacent face of the other to receive said flange and a flange on said last mentioned frame engaging beneath the guide strip.

WILLIAM F. FOLMER.

Witnesses:
 RUSSELL B. GRIFFITH,
 FLORENCE E. FRANCK.